(12) United States Patent
Ishihara et al.

(10) Patent No.: US 7,649,050 B2
(45) Date of Patent: Jan. 19, 2010

(54) TWO PACKAGE TYPE CLEAR COATING COMPOSITION AND METHOD FOR MAKING MULTILAYER COATING FILM

(75) Inventors: Tatsuya Ishihara, Machida (JP); Hiroshi Yokoyama, Zama (JP); Tomoyoshi Saitoh, Yokohama (JP); Tatsuya Suzuki, Machida (JP); Goro Saito, Hiratsuka (JP); Toshiyuki Hanaoka, Hiratsuka (JP); Yoshiyuki Yukawa, Hiratsuka (JP)

(73) Assignees: Nissan Motor Co., Ltd., Kanagawa (JP); Kansai Paint Co., Ltd., Hyogo (JP)

( * ) Notice: Subject to any disclaimer, the term of this patent is extended or adjusted under 35 U.S.C. 154(b) by 58 days.

(21) Appl. No.: 11/902,871

(22) Filed: Sep. 26, 2007

(65) Prior Publication Data

US 2008/0268286 A1    Oct. 30, 2008

(30) Foreign Application Priority Data

Sep. 27, 2006   (JP) .............................. 2006-263472

(51) Int. Cl.
| | |
|---|---|
| *C08L 75/06* | (2006.01) |
| *C08F 20/02* | (2006.01) |
| *C08F 20/62* | (2006.01) |
| *C08G 63/137* | (2006.01) |

(52) U.S. Cl. .................. 525/131; 525/440.01
(58) Field of Classification Search ................... 525/131
See application file for complete search history.

(56) References Cited

U.S. PATENT DOCUMENTS

| 4,382,114 | A | 5/1983 | Höhlein et al. |
| 5,326,820 | A | 7/1994 | Hoffmann et al. |
| 7,208,534 | B2 * | 4/2007 | Van Rooyen ................. 524/37 |

FOREIGN PATENT DOCUMENTS

| JP | 6-220397 | | 8/1994 |
| WO | WO 9620968 A1 * | | 7/1996 |

OTHER PUBLICATIONS

Machine Translation of Marutani (JP 06-220397 A).*

* cited by examiner

*Primary Examiner*—Randy Gulakowski
*Assistant Examiner*—Mike Dollinger
(74) *Attorney, Agent, or Firm*—Wenderoth, Lind & Ponack, L.L.P.

(57) ABSTRACT

A two package type clear coating composition which can form cured coating film excelling in all aspects of scratch resistance, acid resistance, stain resistance and finished appearance such as coated surface smoothness, comprising a hydroxyl-containing acrylic resin (A) having a hydroxyl value of 100-200 mgKOH/g and a number-average molecular weight of 5,000-10,000, which is obtained by copolymerization of a monomeric mixture comprising an aromatic vinyl monomer and a monomer having cyclohexyl ring; a trifunctional HMDI isocyanurate compound (B); and a polyester polyol (C) having a hydroxyl value of 250-350 mgKOH/g and a number-average molecular weight of 350-550, which is obtained by esterification reaction of $C_{3-6}$ diol with dicarboxylic acid having cyclohexyl ring.

13 Claims, No Drawings

TWO PACKAGE TYPE CLEAR COATING COMPOSITION AND METHOD FOR MAKING MULTILAYER COATING FILM

TECHNICAL FIELD

This invention relates to a two package type clear coating composition which forms coating film excelling in scratch resistance, acid resistance and stain resistance.

BACKGROUND ART

Coating to be applied onto articles such as car bodies is required to excel in coating performance such as scratch resistance, acid resistance, stain resistance and finished appearance.

Conventionally, melamine crosslinking type paint is generally used as paint for car bodies. Melamine crosslinking coating is a paint which contains hydroxyl-containing resin and melamine resin crosslinking agent, and shows high crosslinking density when cured by heating. The resulting melamine crosslinked coating excels in coating performance such as scratch resistance and finished appearance, but is subject to a problem that it is prone to be hydrolyzed by acid rain, i.e., is inferior in acid resistance.

JP Hei 6 (1994)-220397A discloses a two package type urethane crosslinking coating composition comprising hydroxyl-containing acrylic resin, hydroxyl-containing oligoester and isocyanate prepolymer. The coating film formed of this paint excels in acid resistance because urethane-crosslinked bonds are difficult to be hydrolyzed, but has a problem that its scratch resistance is insufficient.

DISCLOSURE OF THE INVENTION

An object of the present invention is to provide a two package type clear coating composition which can form cured film excelling in all aspects of scratch resistance, acid resistance, stain resistance and finished appearance such as coated surface smoothness.

We have engaged in concentrative studies with the view to solve the problems, and now discovered that the above object can be met by a two package type clear coating composition comprising a hydroxyl-containing acrylic resin having a specific hydroxyl value and number-average molecular weight, which is obtained by copolymerization of a monomeric mixture comprising an aromatic vinyl monomer and a monomer having cyclohexyl ring; a trifunctional HMDI isocyanurate compound; and a polyester polyol having a specific hydroxyl value and number-average molecular weight, which is obtained through esterification reaction of $C_{3-6}$ diol with dicarboxylic acid having cyclohexyl ring. The present invention is whereupon completed.

Accordingly, therefore, the present invention provides a two package type clear coating composition characterized by comprising a hydroxyl-containing acrylic resin (A) having a hydroxyl value of 100-200 mgKOH/g and a number-average molecular weight of 5,000-10,000, which is obtained by copolymerization of a monomeric mixture comprising an aromatic vinyl monomer and a monomer having cyclohexyl ring; a trifunctional HMDI isocyanurate compound (B); and a polyester polyol (C) having a hydroxyl value of 250-350 mgKOH/g and a number-average molecular weight of 350-550, which is obtained by esterification reaction of $C_{3-6}$ diol with dicarboxylic acid having cyclohexyl ring.

The invention also provides a method for forming multilayer coating film, which comprises applying onto an object to be coated at least a monolayer of color base coating paint and at least monolayer of clear coating paint by the order stated, characterized by using the above-described two package type clear coating composition as the top layer clear coating paint.

The coating composition according to the present invention uses a hydroxyl-containing acrylic resin having a relatively high concentration of hydroxyl group which is a crosslinking functional group and having as its constituent components an aromatic vinyl monomer and cyclohexyl ring-containing monomer which are hard monomeric components, as the base resin. Furthermore, it also uses as the crosslinking agent a trifunctional HMDI polyisocyanurate compound of isocyanurate structure, which is harder as compared with linear structured HMDI, and contains a polyester polyol of a low molecular weight and of a structure having cyclohexyl ring, which contributes to improve scratch resistance. Hence the composition forms coating film of urethane crosslinked structure having a high crosslinking density and well balanced hardness and scratch resistance. Thus the coating composition of the invention achieves the conspicuous effect of forming a cured coating film excelling in all aspects of scratch resistance, acid resistance, stain resistance and finished appearance such as coated surface smoothness.

Hereinafter the two package type clear coating composition (which may be hereafter referred to as "the present paint") and the method for forming a multilayer coating film according to the present invention are explained in further details.

The coating composition of the present invention is a two package type clear coating composition which comprises the combination of a hydroxyl-containing acrylic resin (A) having a hydroxyl value of 100-200 mgKOH/g and a number-average molecular weight of 5,000-10,000, which is obtained by copolymerization of a monomeric mixture comprising an aromatic vinyl monomer and a monomer having cyclohexyl ring; a trifunctional HMDI isocyanurate compound (B); and a polyester polyol (C) having a hydroxyl value of 250-350 mgKOH/g and a number average molecular weight of 350-550, which is obtained by esterification reaction of $C_{3-6}$ diol with dicarboxylic acid having cyclohexyl ring.

Hydroxyl-containing Acrylic Resin (A):

The hydroxyl-containing acrylic resin (A) which is used as the base resin in the coating composition of the present invention is obtained by copolymerization of a monomeric mixture comprising aromatic vinyl monomer and monomer having cyclohexyl ring. Specifically, the resin (A) can be prepared by copolymerizing, for example, hydroxyl-containing monomer (a), aromatic vinyl monomer (b), cyclohexyl ring-containing monomer (c) and optionally still other unsaturated monomer (d), according to the accepted practice.

Hydroxyl-containing monomer (a) is a compound having one each of hydroxyl group and polymerizable unsaturated bond per molecule. As the monomer, for example, monoesterification products of (meth)acrylic acid with $C_{2-10}$ dihydric alcohol, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate and like; adducts of (meth)acrylic acid and epoxy-containing compound (for example, CARDURA-E10, tradename, Yuka Shell Epoxy Co.); ring-opened polymers of ε-caprolactone and the like can be named. As the ring-opened polymers of ε-caprolactone, those available on the market such as PLACCEL FA-1, PLACCEL FA-2, PLACCEL FA-3, PLACCEL FA-4, PLACCEL FA-5, PLACCEL FM-1, PLACEL FM-2, PLACCEL FM-3, PLACCEL FM-4, PLACCEL FM-5 (tradename, Daicel Chemical Industries, Ltd.) can be named. These can be used each alone or in combination of two or more. The use amount of the monomer (a) can be such that the hydroxyl value of the hydroxyl-containing acrylic resin (A) should fall in the range of 100-200 mgKOH/g, in particular, 120-180 mgKOH/g.

In the present specification, "(meth)acrylate" means acrylate or methacrylate; "(meth)acrylic acid" means acrylic acid or methacrylic acid; and "(meth)acryloyl" means acryloy or methacryloyl.

Aromatic vinyl monomer (b) is a compound having one each of aromatic ring such as benzene ring or naphthalene ring and vinyl group per molecule, examples of which include styrene, α-methylstyrene, vinyltoluene and the like.

The monomer (c) having a cyclohexyl ring is a compound having one each of cyclohexyl ring and polymerizable unsaturated bond per molecule, examples of which include cyclohexyl (meth)acrylate and the like.

The aromatic vinyl monomer (b) and cyclohexyl ring-containing monomer (c) are concurrently used for the hydroxyl-containing acrylic resin (A) for improving hardness and weatherability of crosslinked coating film in compatible manner. Concurrent use of styrene and cyclohexyl methacrylate is particularly preferred.

Use amount of each of such aromatic vinyl monomer (b) and cyclohexyl ring-containing monomer (c) is not strictly limited, while generally the aromatic vinyl monomer (b) is used within a range of 5-25 mass %, preferably 7.5-22.5 mass %, inter alia, 10-20 mass %; and the cyclohexyl ring-containing monomer (c), generally within a range of 5-25 mass %, preferably 7.5-22.5 mass %, inter alia, 10-20 mass %; based on the total amount of the monomers which constitute the hydroxyl-containing acrylic resin (A).

Useful unsaturated monomer (d) other than the above is a compound having one polymerizable unsaturated bond per molecule, other than the above hydroxyl-containing monomer (a), aromatic vinyl monomer (b) and cyclohexyl ring-containing monomer (c). Specific examples are as follows:

(1) acid group-containing monomer: This is a compound having at least one acid group (e.g., carboxyl, sulfo, phosphoric acid group and the like) and one polymerizable unsaturated bond per molecule, examples of which include carboxyl-containing monomers such as (meth)acrylic acid, crotonic acid, itaconic acid, maleic acid, maleic anhydride and the like; sulfonic acid group-containing monomers such as vinylsulfonic acid, sulfoethyl (meth)acrylate and the like; and acidic phosphate monomers such as 2-(meth)acryloyloxyethyl acid phosphate, 2-(meth)acryloyloxypropyl acid phosphate, 2-(meth)acryloyloxy-3-chloropropyl acid phosphate, 2-methacryloyloxyethylphenylphosphoric acid and the like:

(2) esterification products of acrylic acid or methacrylic acid with $C_{1-20}$ monohydric alcohol: for example, methyl (meth)acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, tridecyl (meth)acrylate, stearyl (meth)acrylate and the like:

(3) glycidyl-containing vinyl monomer: a compound having one each of glycidyl group and polymerizable unsaturated bond per molecule, for example, glycidyl acrylate, glycidyl methacrylate and the like:

(4) polymerizable unsaturated bond-containing amide compound: for example, acrylic acid amide, methacrylic acid amide, dimethylacrylamide, N,N-dimethylpropylacrylamide, N-butoxymethylacrylamide, N-methylolacrylamide, N-methylolmethacrylamide, diacetonacrylamide and the like:

(5) other vinyl compound: for example, vinyl acetate, vinyl propionate, vinyl chloride, versatic acid vinyl ester and the like; as versatic acid vinyl ester, commercially available Veo Va 9 and Veo Va 10 (tradename; Japan Epoxy Resins Co.):

(6) polymerizable unsaturated bond-containing nitrile compound: for example, acrylonitrile, methacrylonitrile and the like.

These monomers can be used each alone or in combination of two or more.

The hydroxyl-containing acrylic resin (A) can be prepared by copolymerizing above-described hydroxyl-containing monomer (a), aromatic vinyl monomer (b) and cyclohexyl ring-containing monomer (c), and optionally still other unsaturated monomer (d). The use ratios of the monomers in that occasion are not strictly limited but are variable according to the physical properties desired for individual coating composition. Generally, however, based on the combined amount of all the monomers used, the hydroxyl-containing monomer (a) can be within a range of 15-55 mass %, preferably 20-50 mass %, inter alia, 25-45 mass %; the aromatic vinyl monomer (b) as combined with the cyclohexyl ring-containing monomer (c), within a range of 10-40 mass % preferably 15-35 mass %, inter alia, 20-30 mass %; and other unsaturated monomer (d), within a range of 10-75 mass %, preferably 20-60 mass %, inter alia, 30-50 mass %.

Copolymerization of the hydroxyl-containing monomer (a), aromatic vinyl monomer (b), cyclohexyl ring-containing monomer (c), and optionally other unsaturated monomer (d) can be performed by a method known per se, for example, solution polymerization, emulsion polymerization, suspension polymerization or the like. Of these, solution polymerization conducted in an organic solvent in the presence of a polymerization initiator is preferred.

As the organic solvent useful for the solution polymerization, for example, aromatic solvent such as toluene, xylene, SWAZOL 1000 (tradename, COSMO Oil Co., a high boiling point petroleum solvent) and the like; ester solvent such as ethyl acetate, 3-methoxybutyl acetate, ethylene glycol ethyl ether acetate, propylene glycol methyl ether acetate and the like; ketone solvent such as methyl ethyl ketone, methyl isobutyl ketone, methyl amyl ketone and the like; propyl propionate, butyl propionate, ethoxyethyl propionate and the like can be named. These solvents can be used either alone or in combination of two or more. Whereas, because the hydroxyl-containing acrylic resin (A) used in the invention has a relatively high hydroxyl value, use of high boiling point ester-type solvent and ketone solvent is preferred from the viewpoint of solubility of the resin. It is furthermore possible to use them in combination with high boiling point aromatic solvent.

As the polymerization initiator useful at the time of the copolymerization, for example, radical polymerization initiator known per se, such as 2,2'-azobisisobutyronitrile, benzoyl peroxide, di-t-butyl peroxide, di-t-amyl peroxide, t-butyl peroctoate, 2,2'-azobis-(2-methylbutyronitrile) and the like can be named.

Thus obtained hydroxyl-containing acrylic resin (A) can have a hydroxyl value within a range of 100-200 mgKOH/g, preferably 120-180 mgKOH/g, inter alia, 130-170 mgKOH/g. When the hydroxyl value is less than 100 mgKOH/g, intended coating composition may have insufficient curability. On the other hand, when it exceeds 200 mgKOH/g, the coating film formed of the eventually obtained coating composition may have reduced water resistance.

The hydroxyl-containing acrylic resin (A) can also have a number-average molecular weight within a range of 5,000-10,000, preferably 6,000-9,000, inter alia, 6,500-8,500. When the number-average molecular weight is less than 5,000, performance of the coating film formed of the eventually obtained coating composition, such as acid resistance, may deteriorate. Also when it exceeds 10,000, there is a possibility that the coating film formed of the eventually obtained coating composition shows deteriorated surface smoothness.

In the present specification, number-average molecular weight is a value calculated from chromatogram of each sample as measured on gel permeation chromatograph, based on the molecular weight of standard polystyrene. As the gel permeation chromatograph, HLC8120GPC (Tosoh Corporation) is used, and the measurement is made using four columns of TSKgel G-4000HXL, TSKgel G-3000HXL, TSKgel G-2500HXL and TSKgel G-2000HXL (tradename, Tosoh Corporation) under the conditions of mobile phase; tetrahydrofuran, measuring temp.; 40° C., flow rate; 1 cc/min, and detector; RI.

The hydroxyl-containing acrylic resin (A) furthermore preferably has a glass transition temperature within a range of −30 to 30° C., in particular, −20 to 20° C., inter alia, −10 to 10° C. When the glass transition temperature is lower than −30° C., the coating film formed of the eventually obtained coating composition may have insufficient hardness. Whereas, when it exceeds 30° C., the coating film formed of the eventually obtained coating composition may have deteriorated surface smoothness.

Trifunctional HMDI Isocyanurate Compound (B):

The trifunctional HMDI isocyanurate compound (B) which is used as crosslinking agent in the coating composition of the present invention is an isocyanurate ring-containing compound having three isocyanate groups per molecule (i.e., trifunctional), which is obtained by trimerizing hexamethylene diisocyanate (HMDI).

The trifunctional HMDI isocyanurate compound (B) can be obtained by a method known per se, for example, by isocyanurating (trimerizing) hexamethylene diisocyanate (HMDI) at a temperature of about 60° C. in the presence of a catalyst such as quaternary ammonium salt.

The trifunctional HMDI isocyanurate compound (B) has, in its molecular structure, cyclic isocyanurate ring moiety and linear hexamethylene chain moiety, whereby reacting with the above-described hydroxyl-containing acrylic resin (A) to form crosslinked coating film having high density reticulated structure and can impart to the reticulated structure well-balanced elasticity and pliability. It is, therefore, very suitable as crosslinking agent for the coating composition of the present invention.

The trifunctional HMDI isocyanurate compound (B) is available on the market. As specific examples, SUMIDUR N-3300 (tradename, SUMIKA Bayer Urethane Co.), DURANATE TPA-100 (tradename, ASAHI KASEI Corp.), DURANATE THA-100 (tradename, ASAHI KASI Corp.) and the like can be named.

Polyester Polyol (C):

The polyester polyol (C) to be used with the hydroxyl-containing acrylic resin (A) and trifunctional isocyanurate compound (B) in the coating composition of the present invention is a low molecular weight polyester polyol having a hydroxyl value of 250-350 mgKOH/g and a number-average molecular weight of 350-550, which is obtained through esterification reaction of $C_{3-6}$ diol with dicarboxylic acid containing cyclohexyl ring.

The polyester polyol (C) can be prepared by esterification reaction of $C_{3-6}$ diol with cyclohexyl ring-containing dicarboxylic acid according to the accepted practice.

The $C_{3-6}$ diol is a compound having 3 to 6 carbon atoms and 2 hydroxyl groups per molecule, examples of which include dihydric alcohols such as 1,3-propanediol, 1,4-butanediol, 1,5-pentanediol, 1,6-hexanediol, neopentyl glycol, 1,4-cyclohexanediol, 3-methyl-1,5-pentanediol and the like; and hydroxycarboxylic acids such as 2,2-dimethylolpropionic acid, 2,2-dimethylolbutanoic acid and the like. These can be used either alone or in combination of two or more. Of the named diols, 1,3-propanediol is particularly preferred.

Cyclohexyl ring-containing dicarboxylic acid is a compound having two carboxyl groups and at least one cyclohexyl ring per molecule, examples of which include 1,3-cyclohexanedicarboxylic acid, 1,4-cyclohexanedicarboxylic acid, 1,2-cyclohexanedicarboxylic acid and the like. These can be used either alone or in combination of two or more. Of the named dicarboxylic acids, 1,4-cyclohexanedicarboxylic acid is particularly preferred.

The $C_{3-6}$ diol and cyclohexyl ring-containing dicarboxylic acid can be reacted at such a ratio that the resulting polyester polyol will satisfy the specified hydroxyl value and number-average molecular weight. It is normally preferred to react them at a ratio of 0.5-0.7 mol, in particular, 0.53-0.67 mol, of cyclohexyl ring-containing dicarboxylic acid per mol of $C_{3-6}$ diol.

So obtained polyester polyol (C) can have a hydroxyl value within a range of 250-350 mgKOH/g, preferably 270-330 mgKOH/g, inter alia, 280-320 mgKOH/g. When the hydroxyl value is less than 250 mgKOH/g, the coating film formed of the eventually obtained coating composition may have insufficient scratch resistance, and when it exceeds 350 mgKOH/g, the coating film formed of the eventually obtained coating composition may have reduced water resistance.

The polyester polyol (C) can also have a number-average molecular weight within a range of 350-550, preferably 375-525, inter alia, 400-500. When the number-average molecular weight is less than 350, performance of the coating film formed of the eventually obtained coating composition, such as acid resistance, may deteriorate. Also when it exceeds 550, there is a possibility that the coating film formed of the eventually obtained coating composition shows deteriorated surface smoothness.

Clear Coating Composition:

The coating composition according to the present invention comprises the above-described hydroxyl-containing acrylic resin (A), trifunctional HMDI isocyanurate compound (B) and polyester polyol (C) in combination.

From the viewpoints of curability and scratch resistance of the coating film, these three components are normally used at such ratios that the equivalent ratio (NCO/OH) of hydroxyl groups in the hydroxyl-containing acrylic resin (A) and polyester polyol (C) to isocyanate groups in the trifunctional HMDI isocyanurate compound (B) preferably falls within a range of 0.5-2, in particular, 0.7-1.4.

Generally suitable blend ratios of the hydroxyl-containing acrylic resin (A), trifunctional HMDI isocyanurate compound (B) and polyester polyol (C) for making the coating composition of the invention are: based on 100 mass parts of total solid content of these three components, as non-volatile component, the hydroxyl-containing acrylic resin (A) is within a range of 30-75 mass %, preferably 40-65 mass %, inter alia, 40-55 mass %; trifunctional HMDI isocyanurate compound (B), 20-60 mass %, preferably 30-50 mass %, inter alia, 32.5-47.5 mass %; and polyester polyol (C), 3-30 mass %, preferably 5-25 mass %, inter alia, 10-20 mass %.

In the coating composition of the invention, hydroxyl groups in the hydroxyl-containing acrylic resin (A) and polyester polyol react with isocyanate groups of trifunctional HMDI isocyanurate compound (B) at normal temperature. Therefore, in order to secure storage stability, it is desirable to adopt a form of two package type coating composition by separating hydroxyl-containing acrylic resin (A) and polyester polyol (C) from trifunctional HMDI isocyanurate compound (B) and to mix them immediately before use.

The coating composition of the invention usually contains organic solvent in addition to the above three components of hydroxyl-containing acrylic resin (A), trifunctional HMDI isocyanurate compound (B) and polyester polyol (C), and can furthermore contain, where necessary, other paint additives which are customarily used in the field of paint, such as curing catalyst, leveling agent, ultraviolet absorber, light stabilizer, plasticizer and the like.

As the curing catalyst, organometal catalysts such as tin caprylate, dibutyltin di(2-ethylhexanoate), dioctyltin di(2-ethylhexanoate), dioctyltin diacetate, dibutyltin dilaurate, dibutyltin oxide, dioctyltin oxide, lead 2-ethylhexanoate and the like; tertiary amine and the like can be named. These compounds can be used either alone or in combination of two or more. The amount of such curing catalyst is variable depending on kind of the catalyst, while normally it can be within a range of 0-5 mass parts, preferably 0.1-4 mass parts, per 100 mass parts of the total solid content of the three components (A), (B) and (C).

As the ultraviolet absorber, those UV absorbers known per se can be used, examples of which include benzotriazole absorbers, triazine absorbers, salicyclic acid derivative absorbers, benzophenone absorbers and the like. The content of such ultraviolet absorber in the coating composition is, per 100 mass parts of total solid resin content, usually within a range of 0-10 mass parts, preferably 0.2-5 mass parts, inter alia, 0.3-2 mass parts, from the viewpoint of weatherability and yellowing resistance of the coating film.

As the light stabilizer, those known Per se can be used, for example, hindered amine light stabilizers. The light stabilizer content in the coating composition is, per 100 mass parts of total solid resin content, usually within a range of 0-10 mass parts, preferably 0.2-5 mass parts, inter alia, 0.3-2 mass parts, from the viewpoint of weatherability and yellowing resistance of the coating film.

Furthermore, pigments such as colorant, extender and rust-proofing pigment and the like may be contained in an amount not substantially detrimental to transparency of the formed coating film.

These paint additives may be blended in either one of the containers for the two package type coating composition, or may be divided between both containers and blended.

Coating Method:

The objects to which the subject coating composition is applied are not subject to particular limitation, while bodies of various vehicles such as automobiles, two-wheeled vehicles, containers and the like are suitable. The object may be materials to form these bodies, such as metal substrates, e.g., cold-rolled sheet steel, zinc-plated sheet steel, zinc alloy-plated sheet steel, stainless steel sheet, tin-plated sheet steel, aluminum plate, aluminum alloy plate and the like; various plastic materials and the like.

The coating object may also be the metal surfaces of car bodies or metallic substrates which have been given a surface treatment such as phosphate treatment, chromate treatment, complex oxide treatment or the like. Furthermore, such coating objects may be car bodies, metallic substrates and the like, on which undercoat of various electrodeposition paints and/or intermediate coat have been formed.

In putting a two package type coating composition of the present invention to use, the separately stored hydroxyl-containing acrylic resin (A) plus polyester polyol (C) component and trifunctional HMDI isocyanurate compound (B) component are mixed. The mixing can be done by per se known means, such as use of rotary blade type agitator, homogenizer, or the like.

Coating method of the present composition is not particularly limited but wet coating film can be formed by, for example, air spray coating, airless spray coating, rotary atomizing coating, curtain flow coating or the like. Such coating methods can be done under electrostatic impression, where necessary. Of these methods, air spray coating and rotary atomizing coating are particularly preferred. Suitable film thickness of the present coating composition is normally around 10-50 μm, in terms of cured film thickness.

When the present composition is applied by air spray coating, airless spray coating or rotary atomizing coating, preferably viscosity of the composition is adjusted with a solvent such as an organic solvent in advance, to a range suitable for the coating methods, which normally is around 15-60 seconds as measured with Ford cup #4 viscometer at 20° C.

The wet coating film formed by applying the present coating composition onto an object material is then cured. The curing is effected by heating the coating film by heating means known per se, such as an oven, e.g., hot air oven, electric oven, infrared ray induction heating oven or the like. The heating temperature can normally be 60-180° C., preferably 90-150° C. The heating time is not particularly limited, but normally adequate range is about 15-30 minutes.

Use of the present coating composition enables formation of cured coating film excelling in all of scratch resistance, acid resistance, stain resistance and finished appearance, and hence the composition can be conveniently used as top clear coat. The present coating composition is useful particularly as coat for automobiles.

Multilayer Coating Film-forming Method:

According to the invention, a multilayer coating film-forming method is provided, which comprises applying onto an object to be coated at least a monolayer of color base coating paint and at least a monolayer of clear coating paint by the order stated, characterized by using the coating composition of the present invention as the top layer clear coating paint.

Specifically, for example, 2-coat-1-bake system multilayer coating film-forming method comprising applying onto an object material which has been applied with electrocoating and/or intermediate coating, a solvent-based or water-based base coating paint; without curing the resultant base coat or, where necessary, preheating the base coat, for example, at 40-90° C. for about 3-30 minutes, to promote volatilization of solvent in the base coating paint; thereafter onto the uncured base coat film, applying the present coating composition as clear coating paint, and curing the base coat together with the clear coat, is provided.

The coating composition of the present invention can also be conveniently used as top clear coating paint in 3-coat-2-bake system or 3-coat-1-bake system using two kinds of paints as base coating paints.

As the base coating paints to be used in the above embodiments, per se known conventional thermosetting base coating paints can be used, specific examples including paints comprising a base resin such as acrylic resin, polyester resin, alkyd resin, urethane resin or the like, in combination with a curing agent such as amino resin, polyisocyanate compound, blocked polyisocyanate compound and the like.

Also as the base coating paint, high solid type using little organic solvent is preferred from the viewpoint of environmental preservation and resource saving. Water-based paint or powder paint can also be used.

Where two or more layers of clear coat is to be applied in forming a multilayer coating film, conventional thermosetting clear coating paint known per se can be used, besides the coating composition of the present invention.

in each equation

W1, W2 . . . stand for mass percentage of each of the monomers used in the copolymerization, T1, T2 . . . stand for Tg(K) of homopolymer of each of the monomers.

The T1, T2 . . . values are those given in Polymer Handbook (second edition, ed. by J. Brandup and E. H. Immergut).

TABLE 1

| | | Production Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Hydroxyl-containing acrylic resin | | 1 | 2 | 3 | 4 | 5 | 6 | 7 | 8 | 9 | 10 | 11 | 12 |
| Dropped monomeric mixture | styrene | 10 | 10 | 10 | 10 | 10 | 10 | 15 | | 10 | 10 | 10 | 10 |
| | cyclohexyl methacrylate | 10 | 10 | 10 | 10 | 10 | 10 | | | 10 | 10 | 10 | 10 |
| | isobutyl methacrylate | 26 | 30 | 25 | 26 | 26 | 26 | 9 | 35 | 30 | 25 | 26 | 26 |
| | 2-ethylhexyl acrylate | 20 | 27 | 15 | 20 | 20 | 12 | 42 | 30 | 31 | 10 | 20 | 20 |
| | 2-hydroxyethyl acrylate | 34 | 23 | 40 | 34 | 34 | | 34 | 10 | 19 | 45 | 34 | 34 |
| | 4-hydroxybutyl acrylate | | | | | | 42 | | | | | | |
| | 2-hydroxyethyl methacrylate | | | | | | | | 25 | | | | |
| | 2,2-di(t-amylperoxy)butane (note 1) | 1 | 1 | 1 | 2 | 0.75 | 1 | 1 | 1 | 1 | 1 | 3 | 0.5 |
| Resin parameters | solid mass concentration (%) | 60 | 60 | 60 | 60 | 60 | 60 | 60 | 60 | 60 | 60 | 60 | 60 |
| | number-average molecular weight | 7000 | 7000 | 7000 | 5500 | 9000 | 7000 | 7000 | 7000 | 7000 | 7000 | 4000 | 12000 |
| | hydroxyl value (mgKOH/g) | 164 | 111 | 193 | 164 | 164 | 163 | 164 | 156 | 92 | 217 | 164 | 164 |
| | glass transition temperature (° C.) | −4 | 5.6 | −8.3 | −4 | −4 | −9.1 | −15 | 17.2 | 8.4 | −11 | −4 | −4 |

(note 1)
polymerization initiator

EXAMPLES

Hereinafter the invention is explained more specifically, referring to working Examples, it being understood that the invention is not limited to these Examples only. In the Examples, "part" and "%" are by mass, and thickness of coating film is always based on that of cured film.

Production Examples of Hydroxyl-containing Acrylic Resins

Examples 1-12

A four-necked flask equipped with an agitation device, thermometer, cooling tube and nitrogen gas inlet was charged with 31 parts of ethoxyethyl propionate whose temperature was raised to 155° C. under passing nitrogen gas. When 155° C. was reached, nitrogen gas supply was stopped, and into the flask each of monomeric mixture composed of the monomers at the blend ratios and the polymerization initiator, all as indicated in Table 1, was dropped over 4 hours. Thereafter each product was aged for 2 hours under passing nitrogen gas at 155° C., followed by cooling to 100° C. and dilution with 32.5 parts of butyl acetate. Thus hydroxyl-containing acrylic resins having a solid content of 60% were obtained. The solid concentration (%) of so obtained hydroxyl-containing acrylic resins and their parameters are also given in the following Table 1.

The glass transition temperature (° C.) values as given in Table 1 were calculated by the following equations:

$$1/Tg(K) = (W1/T1) + (W2/T2) + \ldots$$

$$Tg(°C.) = Tg(K) - 273$$

Production Examples of Polyester Polyols

Production Examples 13-18

A four-necked flask equipped with a heater, stirrer, thermometer, reflux condenser and water separator was charged with a dicarboxylic acid and diol as shown in the following Table 2 at the indicated mole ratio and the temperature inside the flask was raised from 160° C. to 230° C. over 3 hours. While distilling off the resultant water of condensation through the water separator, the system was kept at 230° C., to continue the reaction until the acid value drops to 5 mgKOH/g or below. The resin parameters of the polyester polyol so obtained are shown in the Table 2.

TABLE 2

| | Production Example | | | | | |
|---|---|---|---|---|---|---|
| | 13 | 14 | 15 | 16 | 17 | 18 |
| Polyester polyol | 1 | 2 | 3 | 4 | 5 | 6 |
| 1,4-cyclohexane-dicarboxylic acid | 0.6 | 0.58 | 0.64 | 0.58 | 0.7 | 0.5 |
| 1,3-propanediol | 1 | | 1 | 1 | 1 | 1 |
| 1,5-pentanediol | | 1 | | | | |
| DBR | 0.6 | 0.58 | 0.64 | 0.58 | 0.7 | 0.5 |
| hydroxyl value | 291 | 264 | 254 | 310 | 203 | 395 |
| number-average molecular weight | 464 | 445 | 490 | 380 | 572 | 304 |

Production of Coating Compositions

Those hydroxyl-containing acrylic resins as obtained in above Production Examples 1-12, polyester polyols as obtained in Production Examples 13-18, and the starting materials as given in the later appearing Table 3, were stirred and mixed at the blend ratios as shown in Table 3, using a rotary blade-type agitator, to convert the mixtures into paints. Thus coating compositions were obtained. The blend ratios of the coating compositions as shown in Table 3 are the solid mass ratios of the components.

In the Table 3, the particulars of (*1)-(*4) each are as follows:

(*1) N-3300: tradename, Sumika Bayer Urethane Co., Ltd., trifunctional hexamethylene diisocyanate (HMDI) isocyanurate compound, solid content 100%, NCO content 21.8%

(*2) TAKENATE D160N: tradename, Takeda Pharmaceutical Co., Ltd., an adduct of hexamethylenediisocyanate and trimethylolpropane, solid content 75%, NCO content 12.6%.

(*3) UV1164: tradename, Ciba Geigy Co., a UV absorber (*4) HALS292: tradename, Ciba Geigy Co., a light stabilizer Each of the coating compositions as obtained in above Examples 1-13 and Comparative Examples 1-10 were adjusted of their viscosity by addition of butyl acetate, to 25 seconds using Ford cup No. 4 at 20° C.

Preparation of Test Panels

Using each of the coating compositions as obtained in Examples 1-13 and Comparative Examples 1-10, which were given so adjusted viscosity, respective test panels were prepared as follows.

A zinc phosphated, 0.8 mm-thick dull steel plate was electrocoated with ELECRON NT-200 (tradename, Kansai Paint Co., a thermosetting epoxy resin-type cationic electrodeposition paint) to the coating film thickness of 20 μm, and cured by heating at 170° C. for 30 minutes. Then onto the cured film, AMILAC KPX-70 (tradename, Kansai Paint Co., polyester-melamine resin type intermediate paint for automobiles) was air spray coated to the film thickness of 35 μm, and cured by heating at 140° C. for 30 minutes. On that coating film, MAGICRON KB-9 BKH3 (tradename, Kansai Paint Co., acryl-melamine resin type solvent-based top base coating paint for automobiles; color, black) was applied to the film thickness of 15 μm and left standing at room temperature for 5 minutes, followed by preheating at 80° C. for 10 minutes. Thereafter onto the uncured top base coating film, each of the coating compositions as prepared in the Examples and Comparative Examples and adjusted of their viscosity was applied to the film thickness of 35 μm, left at room temperature for 10 minutes, and heated at 140° C. for 20 minutes. Thus the upper two layers were cured together, to provide the test panels. Thus obtained test panels were allowed to stand at ambient temperature for 7 days and then given the following coating film performance tests.

Performance Test Results

Scratch resistance: Each test panel was fixed on a test stand and washed with a car washing machine 15 times at 20° C., and then its 20° specular reflectivity (20° gloss value) was measured. Its scratch resistance was evaluated by gloss retention (%) to the 200 gloss value before the test. The higher the gloss retention, the better the scratch resistance. As the car washing machine, PO20FWRC (tradename) by Yasui Sangyo Co. was used.

Acid resistance: Each 0.4 cc of 40% sulfuric acid was dropped on the coating film of each test panel. The test panels were heated on a 60° C. hot plate for 15 minutes and then washed with water. The etching depth (μm) at the spot on which the sulfuric acid had been dropped was measured with surface roughness meter (SURFCOM 570A, tradename, Tokyo Seimitsu Co., Ltd., a surface roughness geometric measuring machine, under the conditions of cut-off 0.8 mm (scanning rate, 0.3 mm/sec., magnification, 5,000×), to evaluate acid resistance. The less the etching depth, the better the acid resistance.

Finished appearance (gloss): This was evaluated by measuring 200 specular reflectivity (20° gloss value) of each test panel.

Stain resistance: Each of the coated test panels was given 600 hour's test in SUNSHINE Weather-O-Meter (Suga Tester Co., an accelerated weathering resistance tester) under the conditions prescribed by JIS K5400. Thereafter a pollutant composed a mixture of mud, carbon black, mineral oil and clay was applied to a piece of flannel and the coated surface was lightly rubbed therewith. The panels were left standing in 20° C./75% RH thermostat for 24 hours, and washed with flowing water. The degree of staining of each coating film was evaluated by value difference (ΔL) of the coated panel, according to the following standard. The less the ΔL, the better the stain resistance. The value difference (ΔL) was calculated according to the following equation:

$$\Delta L = (L \text{ value before the stain resistance test}) - (L \text{ value after the stain resistance test})$$

L values were measured with CR 400 (tradename, Konica Minoluta Holdings, Inc., a tristimulus values direct reading type colorimeter, D65 light source, 2° visual field, diffusion illumination perpendicular light receiving (d/o)). The L values are based on CIE 1976 L*a*b* colorimetric system.

⊙: ΔL<0.2,

○: 0.2≦ΔL<1,

Δ: 1≦ΔL<2,

X: 2≦ΔL.

In the stain resistance test, test panels prepared by the following steps were used: electrocoating a zinc phosphated, 0.8 mm-thick dull steel sheet with ELECRON GT-10 (tradename, Kansai Paint Co., a thermosetting epoxy resin type cationic electrodeposition paint) to the film thickness of 20 μm, curing the same by heating at 170° C. for 30 minutes; applying thereon AMILAC TP-65-2 (tradename, Kansai Paint Co., polyester-melamine resin type intermediate paint for automobiles; color, white) by air spray coating to the film thickness of 35 μm, curing the film by heating at 140° C. for 30 minutes; applying thereon each of the coating compositions as prepared in above Examples and Comparative Examples and adjusted of their viscosity, to the film thickness of 35 μm, leaving the panels standing at room temperature for 10 minutes, and curing the top coating by heating at 140° C. for 20 minutes. Similarly to the other test panels, they were left standing at room temperature for 7 days before being given the stain resistance test.

The results of above performance tests are concurrently shown in Table 3.

TABLE 3

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Hydroxyl-containing acrylic resin | acrylic resin No. | 1 | 2 | 3 | 4 | 5 | 6 | 1 | 1 | 1 | 1 | 1 | 1 | 1 |
| | amount (parts) | 45 | 49 | 43 | 45 | 45 | 45 | 45 | 45 | 45 | 40 | 50 | 41 | 50 |
| Polyester polyol | polyester polyol No. | 1 | 1 | 1 | 1 | 1 | 1 | 2 | 3 | 4 | 1 | 1 | 1 | 1 |
| | amount (parts) | 15 | 16 | 14 | 15 | 15 | 15 | 16 | 15 | 15 | 20 | 10 | 14 | 17 |
| N-3300 (*1) | | 40 | 35 | 43 | 40 | 40 | 40 | 39 | 40 | 40 | 40 | 40 | 45 | 33 |
| UV1164 (*3) | | 2 | 2 | 2 | 2 | 2 | 2 | 2 | 2 | 2 | 2 | 2 | 2 | 2 |
| HALS292 (*4) | | 2 | 2 | 2 | 2 | 2 | 2 | 2 | 2 | 2 | 2 | 2 | 2 | 2 |
| Test result | scratch resistance | 90 | 85 | 92 | 91 | 90 | 92 | 90 | 90 | 91 | 92 | 88 | 90 | 91 |
| | acid resistance (μm) | 0.4 | 0.4 | 0.5 | 0.5 | 0.3 | 0.4 | 0.4 | 0.4 | 0.4 | 0.5 | 0.3 | 0.5 | 0.4 |
| | stain resistance | ○ | ○ | ○ | ○ | ○ | ○ | ○ | ○ | ○ | ○ | ○ | ○ | ○ |
| | finished appearance (gloss) | 90 | 92 | 88 | 92 | 89 | 91 | 90 | 90 | 91 | 92 | 90 | 90 | 90 |

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Hydroxyl-containing acrylic resin | acrylic resin No. | 1 | 7 | 8 | 9 | 10 | 11 | 12 | 1 | 1 | 1 |
| | amount (parts) | 43 | 45 | 46 | 51 | 42 | 45 | 45 | 47 | 43 | 64 |
| Polyester polyol | polyester polyol No. | 1 | 1 | 1 | 1 | 1 | 1 | 1 | 5 | 6 | |
| | amount (parts) | 15 | 15 | 15 | 16 | 14 | 15 | 15 | 16 | 14 | |
| N-3300 (*1) | | | 40 | 39 | 33 | 44 | 40 | 40 | 37 | 43 | 36 |
| TAKENATE D-160N (*2) | | 42 | | | | | | | | | |
| UV1164 (*3) | | 2 | 2 | 2 | 2 | 2 | 2 | 2 | 2 | 2 | 2 |
| HALS292 (*4) | | 2 | 2 | 2 | 2 | 2 | 2 | 2 | 2 | 2 | 2 |
| Test result | scratch resistance | 90 | 90 | 80 | 72 | 92 | 90 | 85 | 82 | 91 | 72 |
| | acid resistance (μm) | 0.6 | 0.6 | 0.6 | 0.4 | 0.6 | 0.7 | 0.4 | 0.6 | 0.8 | 0.4 |
| | stain resistance | Δ | Δ | Δ | ○ | Δ | Δ | ○ | Δ | Δ | ○ |
| | finished appearance (gloss) | 90 | 90 | 87 | 88 | 85 | 91 | 80 | 90 | 90 | 89 |

The invention claimed is:

1. A two package type clear coating composition comprising a hydroxyl-containing acrylic resin (A) having a hydroxyl value of 100-200 mgKOH/g and a number-average molecular weight of 5,000-10,000, which is obtained by copolymerization of a monomeric mixture comprising an aromatic vinyl monomer and a monomer having cyclohexyl ring; a trifunctional hexamethylene diisocyanate isocyanurate compound (B); and a polyester polyol (C) having a hydroxyl value of 250-350 mgKOH/g and a number-average molecular weight of 350-550, which is obtained by esterification reaction of 1,3-popanediol with 1,4-cyclohexane dicarboxylic acid wherein the two package type clear coating composition contains, as non-volatile component, the hydroxyl-containing acrylic resin (A) within a range of 30-75 mass %; the trifunctional hexamethylene diisocyanate isocyanurate compound (B) within a range of 20-60 mass %; and polyester polyol (C) within a range of 3-30 mass %; based on 100 mass parts of total solid content of components (A), (B) and (C).

2. A two package type clear coating composition according to claim 1, in which the hydroxyl-containing acrylic resin (A) is obtained by copolymerization of a monomeric mixture comprising hydroxyl-containing monomer (a), aromatic vinyl monomer (b), cyclohexyl ring-containing monomer (c) and optionally still other unsaturated monomer (d).

3. A two package type clear coating composition according to claim 2, in which the aromatic vinyl monomer (b) is styrene and the cyclohexyl ring-containing monomer (c) is cyclohexyl methacrylate.

4. A two package type clear coating composition according to claim 2, in which the aromatic vinyl monomer (b) is used within a range of 5-25 mass % and the cyclohexyl ring-containing monomer (c), within a range of 5-25 mass %, based on the total amount of the monomers constituting the hydroxyl-containing acrylic resin (A).

5. A two package type clear coating composition according to claim 1, in which the hydroxyl-containing acrylic resin (A) has a hydroxyl value of 120-180 mgKOH/g.

6. A two package type clear coating composition according to claim 1, in which the hydroxyl-containing acrylic resin (A) has a number-average molecular weight of 6,000-9,000.

7. A two package type clear coating composition according to claim 1, in which the hydroxyl-containing acrylic resin (A) has a glass transition temperature of −30 to 30° C.

8. A two package type clear coating composition according to claim 1, in which the polyester polyol (C) has a hydroxyl value of 270-330 mgKOH/g.

9. A two package type clear coating composition according to claim 1, in which the polyester polyol (C) has a number-average molecular weight of 375-525.

10. A two package type clear coating composition according to claim 1, in which the three components (A), (B) and (C) are used at such ratios that the equivalent ratio (NCO/OH) of the hydroxyl groups in the hydroxyl-containing acrylic resin (A) and polyester polyol (C) to the isocyanate groups in the trifunctional hexamethylene diisocyanate isocyanurate compound (B) will fall within a range of 0.5-2.

11. A two package type clear coating composition according to claim 1, which is in the form of two package type coating composition wherein the hydroxyl-containing acrylic resin (A) plus polyester polyol (C) are separated from the trifunctional hexamethylene diisocyanate isocyanurate compound (B).

12. A method for forming multilayer coating film, which comprises applying onto an object to be coated at least a monolayer of color base coating paint and at least monolayer of clear coating paint by the order stated, by using the two package type clear coating composition according to claim 1 as the top layer clear coating paint.

13. Articles coated by the method according to claim 12.

* * * * *